Figure 1:
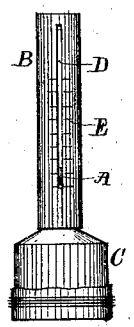
Figure 2:
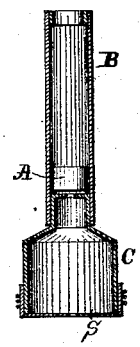

D. M. SMALL.
GAS TEST-GAGES.

No. 194,737. Patented Aug. 28, 1877.

Witnesses.

Inventor:

UNITED STATES PATENT OFFICE.

DEXTER M. SMALL, OF NEW YORK, N. Y.

IMPROVEMENT IN GAS-TEST GAGES.

Specification forming part of Letters Patent No. 194,737, dated August 28, 1877; application filed February 7, 1877.

*To all whom it may concern:*

Be it known that I, DEXTER M. SMALL, of the city, county, and State of New York, have invented an Improvement in Gas-Test Meters, of which the following is a specification:

In the accompanying drawings, which are made a part of this specification, A represents a cap, made of brass or other suitable material, drawn thin and made small so as to be very light, in order that the force of the gas at a low as well as at a high pressure may raise it within the tube B, in which it fits so closely that its own weight will just cause it to drop through the tube. C represents the base of the meter, to which the tube B is attached, as in the drawing, and in operation the cap A being raised a little.

Within or around the base C, at the bottom, is a rubber socket, made to fit closely around the burner or anything similar to be tested, which is done by pressing the top of the burner up through the aperture in the rubber socket into the base C, which is made hollow, with a small hole in the top leading up into the tube B, so that all the gas must pass up into the tube B, and raise the cap A to enable it to escape through the slot D, which should only be sufficiently wide to render the cap A easily visible through it. Thus the more rapidly the gas passes up through the tube B the higher it raises the cap A.

On the tube B, near the slot D, is marked a graduated scale, E, so the relative position of the cap A can be seen in connection with it through the slot D, and thus the rate at which the gas is passing through the meter be seen at once, as each mark on the scale indicates the rate at which the gas is passing through the meter when the cap A is raised to that mark.

The scale E is made by connecting the instrument, after being otherwise all completed, with an ordinary test-meter in the same manner as it is connected with a burner, as before described; and when it is ascertained by this test-meter that the gas is passing through the instrument at the rate of one foot per hour, for instance, mark on the tube the point to which the cap A is raised, and so on for each foot and fraction of a foot, if desired.

In the top of the tube B, I have placed a little ring to prevent the cap A from being lost out.

I claim as my invention—

The cap A and scale E, with tube B, containing slot D, and adjusted to fit over a burner, substantially as described, and for the purpose set forth.

DEXTER M. SMALL.

Witnesses:
EDWIN M. FOX,
THOMAS J. CLUTE.